United States Patent
Park et al.

(10) Patent No.: US 7,825,894 B2
(45) Date of Patent: Nov. 2, 2010

(54) DISPLAY DEVICE WITH DISPLAY PANEL PROCESSING INPUT DATA

(75) Inventors: Sang-Jin Park, Yongin-si (KR);
Jong-Whan Cho, Gunpo-si (KR);
Kee-Han Uh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 683 days.

(21) Appl. No.: 11/771,282

(22) Filed: Jun. 29, 2007

(65) Prior Publication Data

US 2008/0012999 A1 Jan. 17, 2008

Related U.S. Application Data

(62) Division of application No. 10/785,658, filed on Feb. 23, 2004, now abandoned.

(30) Foreign Application Priority Data

Apr. 8, 2003 (KR) ...................... 10-2003-0021877

(51) Int. Cl.
*G09G 3/36* (2006.01)
(52) U.S. Cl. ...................... 345/104; 345/173
(58) Field of Classification Search ................. 345/104, 345/173–175, 179, 182, 183, 204, 87, 88
See application file for complete search history.

(56) References Cited

U.S. PATENT DOCUMENTS

| | | | |
|---|---|---|---|
| 4,097,128 A | 6/1978 | Matsumoto et al. | |
| 4,345,248 A | 8/1982 | Togashi et al. | |
| 5,204,661 A | 4/1993 | Hack et al. | |
| 5,485,177 A | 1/1996 | Shannon et al. | |
| 5,910,829 A | 6/1999 | Shimada et al. | |
| 5,920,401 A | 7/1999 | Street et al. | |
| 6,099,185 A | 8/2000 | Huang et al. | |
| 6,195,140 B1 | 2/2001 | Kubo et al. | |
| 6,778,238 B2 | 8/2004 | Moon et al. | |
| 2002/0021291 A1 | 2/2002 | Cook | |
| 2002/0030768 A1 | 3/2002 | Wu | |
| 2005/0052435 A1 | 3/2005 | Cho et al. | |

FOREIGN PATENT DOCUMENTS

| | | |
|---|---|---|
| JP | 07325319 A | 12/1995 |
| JP | 03-314633 | 11/1996 |
| JP | 09-114584 | 5/1997 |
| JP | 11-326954 A | 11/1999 |

OTHER PUBLICATIONS

PCT International Search Report; International Application No. PCT/KR2004/000438; International filing date: Feb. 28, 2004: Date of Mailing: Aug. 30, 2004.

*Primary Examiner*—Ricardo L Osorio
(74) *Attorney, Agent, or Firm*—Cantor Colburn LLP

(57) ABSTRACT

An image display device includes a display surface through which input light is applied from an external object, a color filter having color pixels that are arranged to form a planar surface substantially parallel with the display surface, a substrate having light sensing portions each disposed to face corresponding one of the color pixels, in which the light sensing portion senses light provided through the corresponding color pixel, and a liquid crystal layer disposed between the color filter and the substrate. The substrate includes pixel portions arranged in a matrix form to display images. The light sensing portion includes switching transistors that are respectively controlled by the input light and a gate signal and respectively connected to sensing lines.

12 Claims, 6 Drawing Sheets

200

100

DISPLAY DEVICE WITH DISPLAY PANEL PROCESSING INPUT DATA

CROSS REFERENCE TO RELATED APPLICATIONS

This application is a divisional application of U.S. application Ser. No. 10/785,658 filed Feb. 23, 2004, which claims priority to and the benefit of Korean Patent Application No. 2003-0021877 filed on Apr. 8, 2003, all of which are incorporated by reference herein in their entirety.

BACKGROUND OF THE INVENTION

1. Field of the Invention

The present invention relates to image display devices, and more particularly, to an image display device receiving input data through a display panel thereof, which then processes the input data.

2. Description of the Related Art

A touch panel is generally used in image display devices as a data input apparatus. In a typical image display device with a touch panel, the touch panel is disposed at the surface (or screen) of an image display device and touched by an object, such as a finger, a light pen, etc., to received input data. In general, a display menu is shown on a screen and one or more options are selected using the object (e.g., a light pen). The touch panel senses a position where the object makes contact with the screen, and outputs a position signal corresponding to the position where the object makes contact with the screen, thereby operating the image display device.

Since the image display devices having a touch panel do not require an additional data input apparatus (e.g., keyboard, mouse, etc.), they have gained popularity and been widely used in various products. Recently, the touch panels are used in liquid crystal display (LCD) devices. A touch panel is disposed on an LCD panel for displaying images and detects positions of an object selected by a user.

Generally, a touch panel includes a first substrate, a second substrate spaced apart from the first substrate in a predetermined distance, and first and second transparent electrodes formed at the first and second substrates, respectively. In order to couple the LCD panel and the touch panel of an LCD device, the LCD device uses a frame or adhesive disposed between the LCD panel and the touch panel. By employing such coupling method, however, air space is formed between the LCD panel and the touch panel. Since the air space has a refractive index different from those of the LCD panel and the touch panel, the optical properties of the LCD device is deteriorated.

Also, since the conventional touch panels have a pair of substrates and transparent electrodes disposed therebetween, there has been an increase in thickness of the conventional LCD devices employing such touch panels and in their manufacturing cost as well.

BRIEF SUMMARY OF THE INVENTION

The above-discussed and other drawbacks and deficiencies of the prior art are overcome or alleviated by the image display device of the present invention. In one embodiment, an image display device includes a display surface through which input light is applied from an external object, a color filter having color pixels that are arranged to form a planar surface substantially parallel with the display surface, and a substrate having at least one light sensing portion disposed to face corresponding one of the color pixels, in which the at least one light sensing portion senses light provided through the corresponding color pixel. The substrate may also include pixel portions arranged in a matrix form to display images.

The pixel portions each include a gate line providing a gate signal, a data line providing an image data signal, and a first switching member having a conduction path between the data line and a pixel electrode disposed on the substrate, in which the first switching member is controlled by the gate signal. The light sensing portion includes a second switching member that is controlled by the light provided through the corresponding color pixel and transfers a first signal provided via a data line in response to the light, a first sensing line electrically connected to the second switching member, and a third switching member that is controlled by a second signal provided via a gate line and transfers the first signal from the second switching member to a second sensing line in response to the second signal.

These and other objects, features and advantages of the present invention will become apparent from the following detailed description of illustrative embodiments thereof, which is to be read in connection with the accompanying drawings.

BRIEF DESCRIPTION OF THE DRAWINGS

This disclosure will present in detail the following description of exemplary embodiments with reference to the following figures wherein.

DETAILED DESCRIPTION OF THE INVENTION

Detailed illustrative embodiments of the present invention are disclosed herein. However, specific structural and functional details disclosed herein are merely representative for purposes of describing exemplary embodiments of the present invention.

Figure 1:
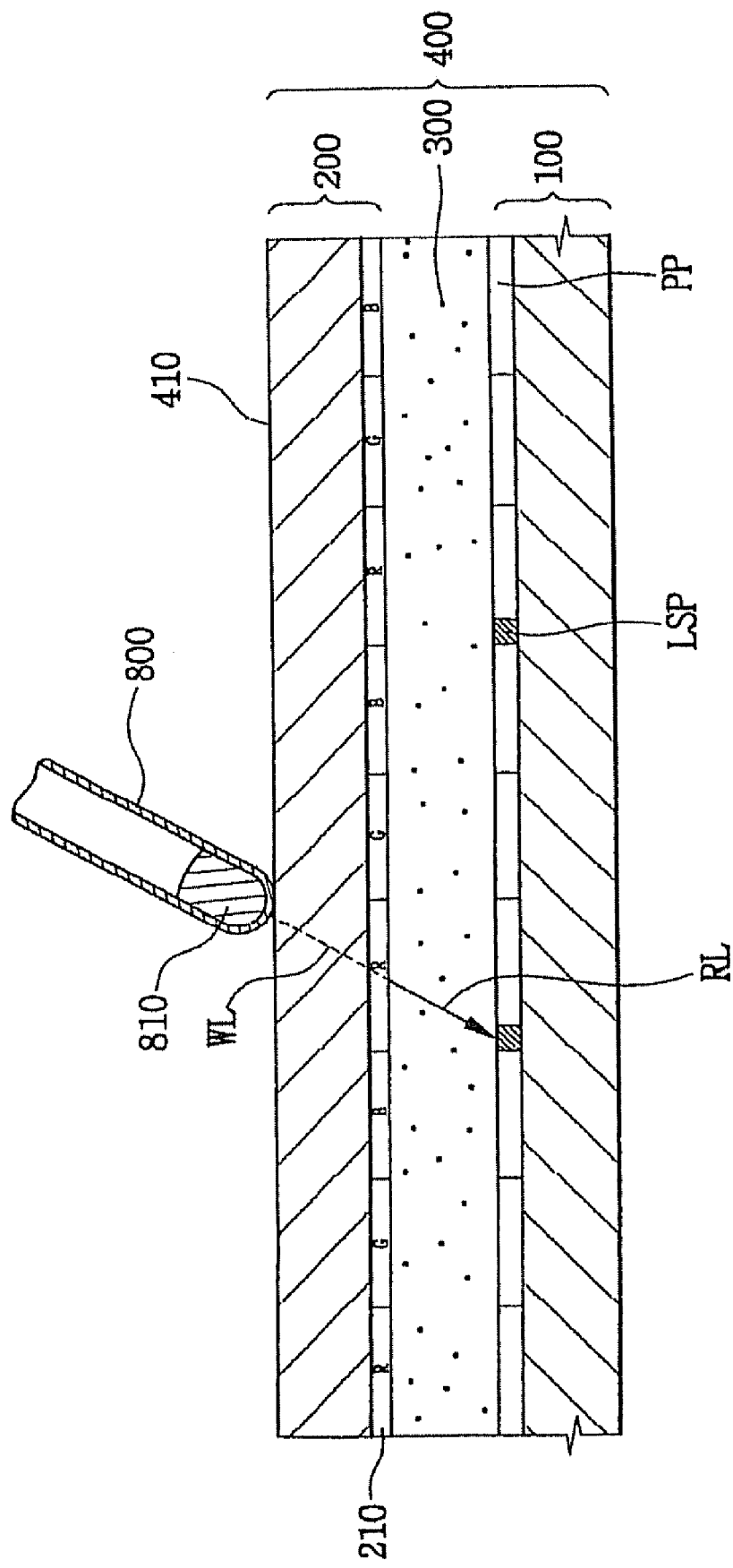
FIG. 1 is a schematic cross-sectional view illustrating an LCD device according to an exemplary embodiment of the present invention.
Figure 2:
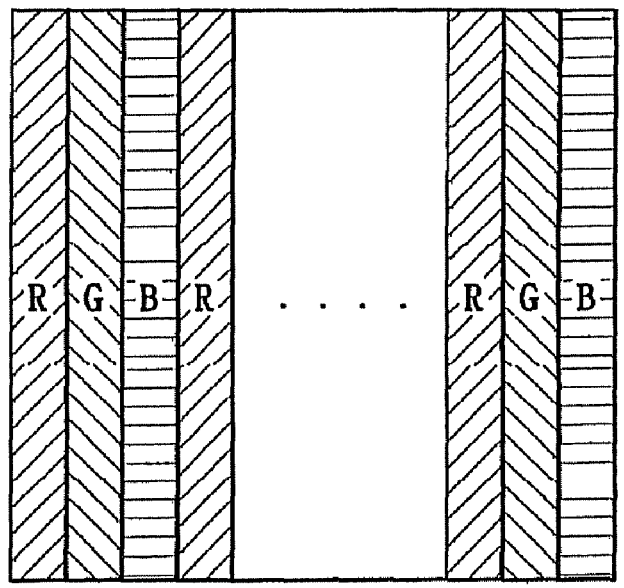
FIG. 2 is a schematic plan view of the color filter substrate in FIG. 1.

FIG. 1 is a schematic cross-sectional view illustrating a liquid crystal display (LCD) device according to an exemplary embodiment of the present invention. FIG. 2 is a schematic plan view of a color filter substrate of the LCD device in FIG. 1, and FIG. 3 is a schematic plan view of an array substrate of the LCD device in FIG. 1.

Figure 3:
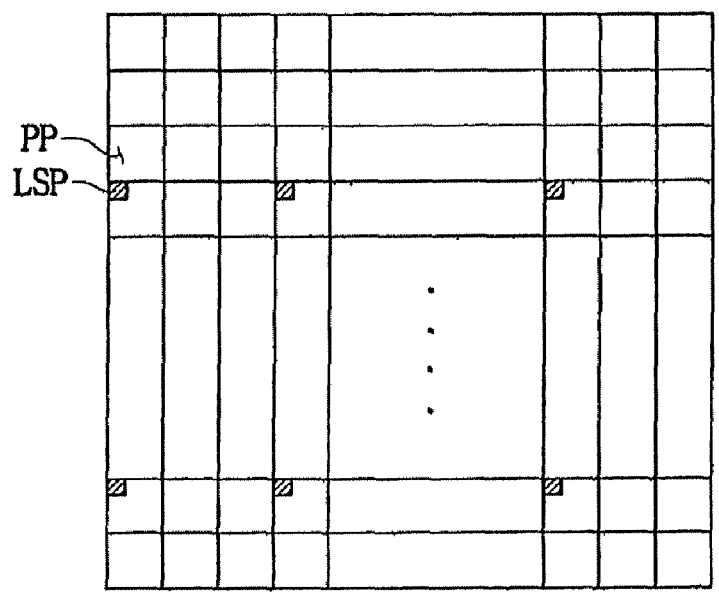
FIG. 3 is a schematic plan view of the array substrate in FIG. 1.

Referring to FIGS. 1 to 3, the LCD device includes an LCD panel 400 having an array substrate 100, a color filter substrate 200 facing the array substrate 100, and a liquid crystal layer 300 interposed between the array substrate 100 and the color filter substrate 200. The LCD panel 400 displays images in response to image data and control signals externally provided.

The array substrate 100 includes a plurality of pixel portions PP arranged in a matrix form to display images and a plurality of light sensing portions LSP for sensing the light input through a display surface 410 of the LCD panel 400 and for generating position information that indicates a position at which the light is applied to the display surface 410.

In the array substrate 100, the light sensing portions LSP each have an areal size smaller than that of the respective pixel portions PP. Also, the number of the light sensing portions LSP is smaller that that of the pixel portions PP in a unit area. In other words, the density of the light sensing portions LSP is lower than that of the pixel portions PP. For example, multiple pixel portions PP are disposed between the adjacent light sensing portions LSP. By having such structure, the opening ratio of the LCD panel 400 is prevented from being deteriorated due to the light sensing portions LSP.

Referring to FIGS. 1 and 2, the color filter substrate 200 includes a color filter 210 on which red (R), green (G) and blue (B) color pixels are formed. As shown in FIG. 2, the G color pixel is formed adjacent to the R color pixel, the B color pixel is formed adjacent to the G color pixel, and the R color pixel is formed adjacent to the B color pixel. The R, G and B color pixels each have a stripe shape extended in a predetermined direction between the opposite ends of the color filter substrate 200.

In this embodiment, each of the R color pixels of the color filter 210 and corresponding one of the light sensing portions LSP are disposed to face each other. Thus, white light WL incident into the display surface 410 of the LCD panel 400 is changed into red light RL by passing through the R color pixel and provided to the light sensing portion LSP corresponding to the R color pixel. The red light RL from the R color pixel has a wavelength from about 600 nm to about 700 nm. Preferably, the red light RL from the R color pixel has a wavelength from about 600 nm to about 660 nm.

The white light WL is externally provided from a light pen 800 to the LCD panel 400. The light pen 800 includes a light emitting diode (LED) 810 that emits the white light WL. The LED 810 is mounted at an end portion of the light pen 800, which makes contact with the display surface 410 of the LCD panel 400.

The white light WL emitted from the LED 810 is changed into the red light RL while passing through the R color pixel, and the red light RL is provided to the light sensing portions LSP. Thus, although the LED 810 emits the white light WL, the light sensing portions LSP receive the red light RL. In another embodiment, however, the light pen 800 may have an LED emitting the red light having a wavelength from about 600 nm to about 700 nm.

Figure 4:
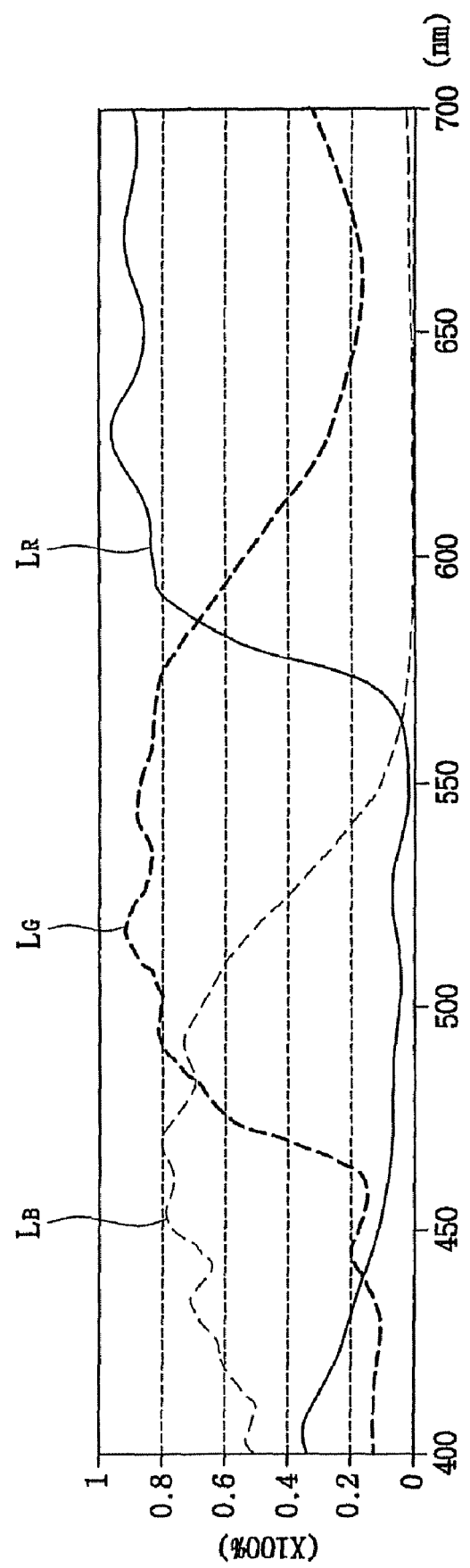
FIG. 4 is a waveform showing transmission spectrum of the R, G and B color pixels in FIG. 1.

FIG. 4 is a waveform of transmission spectrum of the R, G and B color pixels of the LCD panel 400. In FIG. 4, the transmission spectrum was obtained from the experiments in which light is emitted from a light source of CIE standard illuminant D65 to the display surface 410 of the LCD panel 400. Here, "D65" indicates daylight having a color temperature of 6504K. In FIG. 4, the solid line $L_R$, the bold dotted line $L_G$ and the thin dotted line $L_B$ represent transmission spectrums of the light passing through the R, G and B color pixels, respectively. In FIG. 4, the x-axis represents a wavelength (nm) of the light, and the y-axis represents transmittance of the light at the color pixels.

In case of the light having a wavelength from about 400 nm to about 500 nm, transmittance of the blue light passing through the B color pixel is higher than those of the red light passing through the R color pixel and the green light passing through the G color pixel. In case of the light having a wavelength from about 500 nm to about 600 nm, the transmittance of the green light passing through the G color pixel is higher than those of the red light passing through the R color pixel and the blue light passing through the B color pixel. In case of the light having a wavelength from about 600 nm to about 700 nm, the transmittance of the red light passing through the R color pixel is higher than those of the green light passing through the G color pixel and the blue light passing through the B color pixel.

As shown in FIG. 4, the transmittance of the green light and blue light respectively passing through the G and B color pixels is lower than the transmittance of the red light passing through the R color pixel considering the overall range of the wavelength. Especially, the transmittance of the red light passing through the R color pixel approximates to 100% in the wavelength range from about 600 nm to about 700 nm. Also, comparing the wavelength bandwidths having high transmittance of the light passing through the R, G and B color pixels, the red light passing through the R color pixel has a wider wavelength bandwidth than those of the blue light and green light.

Thus, when the red light having the wavelength from about 600 nm to about 700 nm is incident on the R color pixel, the light sensing portions LSP have improved sensitivity because the transmittance of the red light passing through the R color pixel becomes greater.

In the following Table, shown are the light sources providing light to the light sensing portions LSP arranged at the array substrate 100 through the display surface 410 of the LCD panel 400 and values of photocurrent from the light sensing portions LSP in accordance with the color pixels corresponding to the light sensing portions LSP.

TABLE

|  | R color pixel | G color pixel | B color pixel |
|---|---|---|---|
| darkroom | 0.872 nA | 0.872 nA | 0.872 nA |
| Room | 10 nA | 14.9 nA | 14.9 nA |
| red RED | 1250 nA | 99.4 nA | 55.9 nA |
| green LED | 53.3 nA | 67.4 nA | 86.8 nA |
| ultraviolet LED |  |  | 10 nA |
| red laser | 1410 nA | 105 nA | 10.9 nA |

Referring to the above Table, the photocurrent of the light sensing portions LSP is higher when the light sensing portions LSP receives the light from the red LED or red laser than when the light sensing portions LSP receives indoor light or light from the ultraviolet LED or green LED. In the Table, the red light emitted from the red LED has a wavelength of about 630 nm.

Also, the photocurrent from the light sensing portions LSP is higher when the light sensing portions LSP are disposed at a position corresponding to the R color pixel than when the light sensing portions LSP are disposed at a position corresponding to the G and B color pixels. Especially, in case that the red light emitted from the red LED or red laser passes through the R color pixel, the photocurrent from the light sensing portions LSP was greatly increased.

As shown in the above Table, since a condensing efficiency of the light emitted from the red laser is higher than that of the light emitted from the red LED, the photocurrent from the light sensing portions LSP was higher when using the red laser than when using the red LED. When the red light is provided to the light sensing portions LSP of the LCD panel 400, the red light is directly emitted from the LED or white light is changed into the red light by passing through the R color pixel.

In another embodiment, the LED emits the red light and the LCD device has the R color pixel disposed at a position corresponding to the respective light sensing portions LSP. In this case, the red light emitted from the LED is provided to the light sensing portions LSP after passing through the R color pixel, thereby improving the sensitivity of the light sensing portions LSP.

Figure 5:
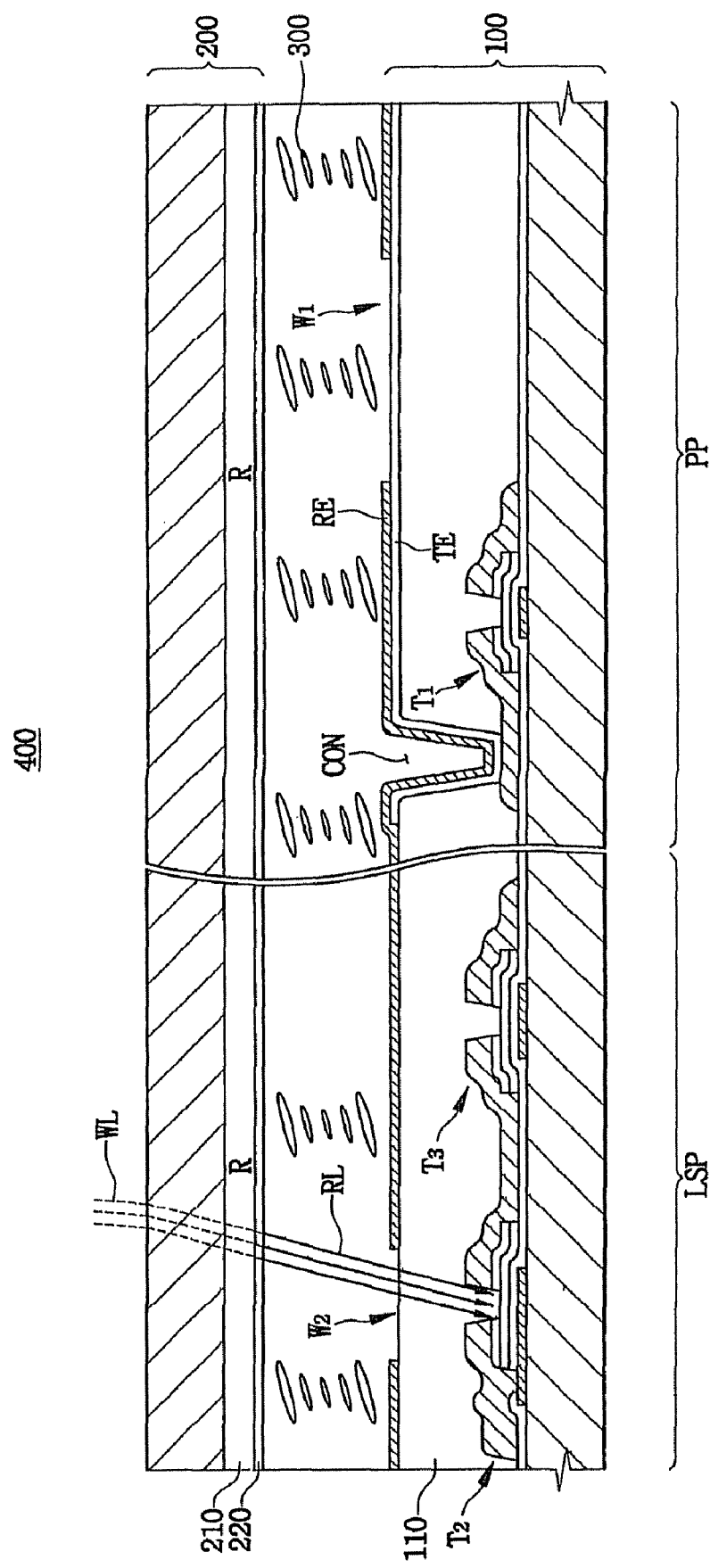
FIG. 5 is a partial cross-sectional view of the LCD device in FIG. 1.
Figure 6:
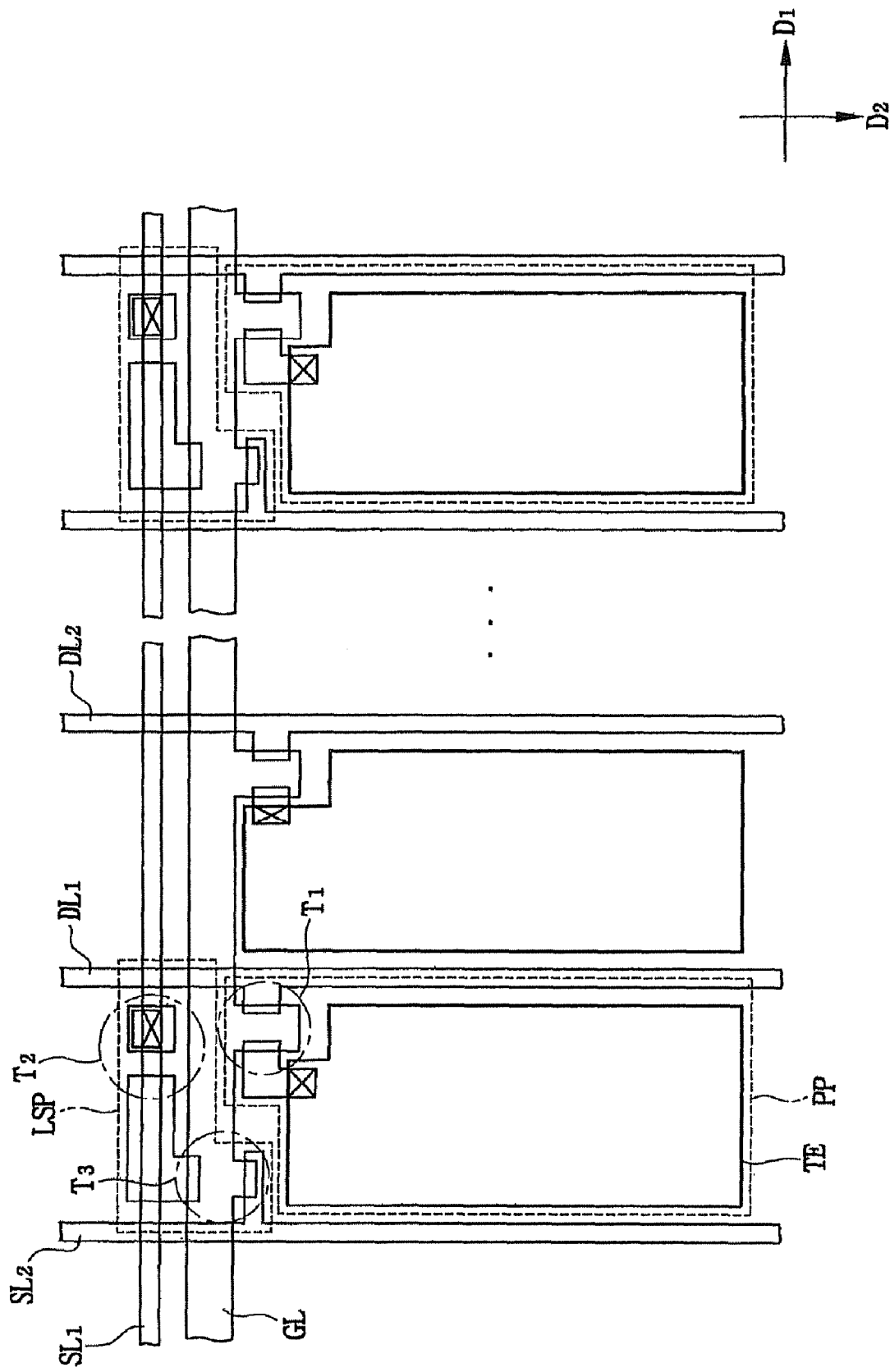
FIG. 6 is a plan view the array substrate in FIG. 5.

FIG. 5 is a schematic cross-sectional view illustrating selected parts of the LCD panel in FIG. 1, and FIG. 6 is a schematic plan view of the array substrate in FIG. 5. Referring to FIGS. 5 and 6, the LCD panel 400 includes the array substrate 100, the color filter substrate 200 facing the array substrate 100, and the liquid crystal 300 interposed between the array substrate 100 and the color filter substrate 200.

The color filter substrate 200 includes the color filter 210 on which the R, G and B color pixels are formed, and a common electrode 220. The R color pixel of the color filter 210 is disposed at a position facing the corresponding light sensing portion LSP. Thus, the white light WL provided through the display surface 410 of the LCD panel 400 is changed into the red light RL while passing through the R color pixel, and then provided to the corresponding light sensing portion LSP.

The common electrode 220 includes a transparent conductive material, for example, indium tin oxide (ITO), indium zinc oxide (IZO), etc., and is formed on the color filter 210 having a uniform thickness.

The array substrate 100 includes the pixel portions PP and the light sensing portions LSP. Each of the pixel portions PP includes a gate line GL extended in a first direction D1, a data line DL extended in a second direction D2 substantially perpendicular to the first direction D1, a first thin film transistor (TFT) T1 connected to the gate and data lines GL and DL, a transparent electrode TE connected to the first TFT T1, and a reflective electrode RE connected to the first TFT T1.

The first TFT T1 includes a gate electrode branched from the gate line GL, a source electrode branched from the data line DL, and a drain electrode connected to the transparent and reflective electrodes TE and RE. The first TFT T1 is, for example, an amorphous silicon (a-Si) TFT.

Each of the light sensing portions LSP includes a first sensing line SL1 extended in the first direction D1, a second sensing line SL2 extended in the second direction D2, a second TFT T2 driven in response to the red light RL externally provided through the R color pixel, and a third TFT T3 electrically connected to the second TFT T2. The second and third TFTs T2 and T3 are, for example, a-Si TFTs.

The second TFT T2 includes gate and source electrodes commonly connected to the first sensing line SL1, and a drain electrode connected to the third TFT T3. The first sensing line SL1 is formed on a same surface as the gate line GL and insulated from the gate line GL.

The third TFT T3 includes a gate electrode branched from the gate line GL, a source electrode connected to the drain electrode of the second TFT T2, and a drain electrode branched from the second sensing line SL2. The second sensing line SL2 is formed on a same surface as the data line DL and insulated from the data line DL.

The transparent electrode TE is formed on an insulating layer 110 covering the first, second and third TFTs T1, T2 and T3, and electrically connected to the first TFT T1 through a contact hole CON through which the drain electrode of the first TFT T1 is exposed. The transparent electrode TE includes, for example, ITO or IZO.

The reflective electrode RE is formed on the transparent electrode TE and includes a transmissive window W1 that partially exposes the transparent electrode TE and an opening window W2 that partially exposes the second TFT T2. The reflective electrode RE includes, for example, a single reflective layer having aluminum-neodymium (AlNd) or a double reflective layer having aluminum-neodymium (AlNd) and molybdenum-tungsten (MoW).

The transmissive window W1 transmits the first light which is externally provided through a rear surface of the LCD panel 400. The reflective electrode RE reflects the second light which is incident into the display surface 410 of the LCD panel 400. Since the second TFT T2 is exposed through the opening window W2, the white light WL externally provided through the display surface is provided to the second TFT T2 after being changed into the red light RL by passing through the R color pixel.

Also, the reflective electrode RE covers the first and third TFTs T1 and T3 to block the first and third TFTs T1 and T3 from the red light RL, so that the first and third TFTs T1 and T3 are prevented from being operated in response to the red light RL.

Figure 7:
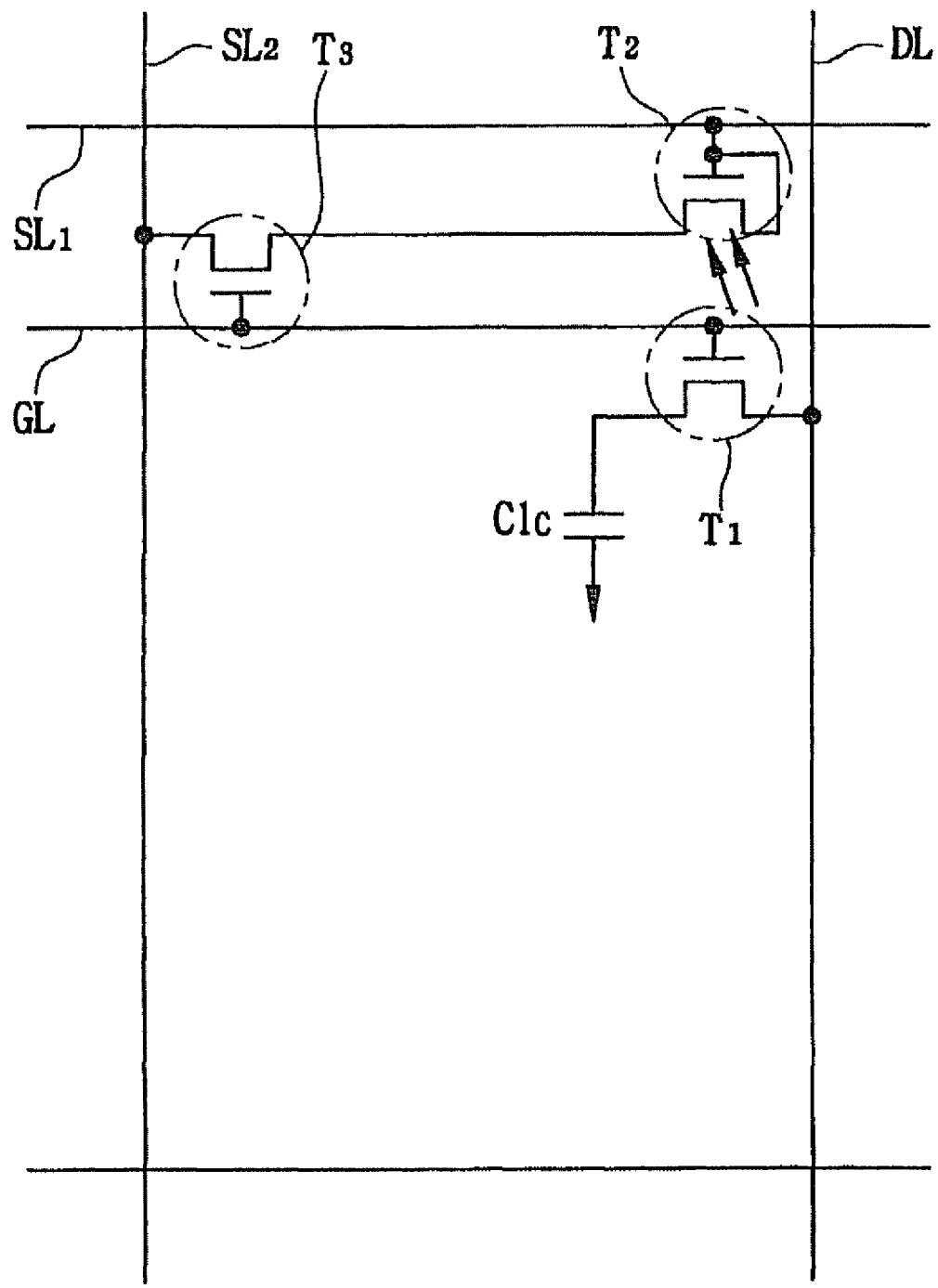
FIG. 7 is a schematic circuit diagram illustrating the pixel portion and the light sensing portion of the array substrate in FIG. 6.

FIG. 7 is a schematic circuit diagram illustrating the pixel portion and the light sensing portion of the array substrate in FIG. 6. Referring to FIG. 7, each of the pixel portions PP includes the gate line GL, data line DL, the first TFT T1 where the gate and source electrodes are connected to the gate and data lines GL and DL, respectively, and a liquid crystal capacitor Clc connected to the drain electrode of the first TFT T1.

Each of the light sensing portions LSP includes the first sensing line SL1, the second sensing line SL2, the second TFT T2 where the gate electrode is connected to the first sensing line SL1, and third TFT T3 where source and drain electrodes are connected to the second TFT T2 and the second sensing line SL2, respectively.

When the white light WL is provided to the display surface 410 of the LCD panel 400 from the light pen 800 by a user, the white light WL is changed into the red light RL while passing through the R color pixel, and the red light is provided to the light sensing portions LSP in the LCD panel 400. The second TFT T2 of the light sensing portions LSP is controlled by the red light RL. In other words, the second TFT T2 is turned on to operate in response to the red light RL.

When the second TFT T2 is driven, a first signal provided to the source electrode of the second TFT T2 is output through the drain electrode of the second TFT T2. An image signal having image information is output from a driving part that drives the LCD panel 400, and applied to the liquid crystal capacitor Clc via the first TFT T1 as a data driving voltage.

The third TFT T3 is driven in response to a second signal provided via the gate line GL. The first signal output from the drain electrode of the second TFT T2 is provided to the source electrode of the third TFT T3, and output via the drain electrode of the third TFT T3. The second signal is output from the driving part and applied to the gate electrode of the first TFT T1 as a gate driving voltage. Thus, the LCD device senses the externally provided input signal (light) using the light sensing portions LSP in the LCD panel 400 and the LCD panel 400 is driven in response to the input signal.

According to the LCD device of the present invention, the color filter substrate includes the R, G and B color pixels, and the array substrate includes the light sensing portions disposed under the corresponding R color pixels so as to sense the red light passing through the R color pixels. When white light is provided from an external object (e.g., a light pen) as input data, the white light is changed into red light by passing through a corresponding R color pixel. The red light is then provided to a light sensing portion corresponding to the R color pixel.

By applying the red light to the light sending portions, the light efficiency and transmittance are improved. As a result, the photocurrent generated from the TFT of the light sensing portions increases, thereby improving the sensitivity of the light sensing portions and the operating properties of the LCD device.

Having described the exemplary embodiments of the LCD device according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A display device for displaying images in response to image and control signals, comprising:
   a display surface through which input light is applied from an external object;
   a color filter having color pixels that are arranged to form a planar surface substantially parallel with the display surface; and
   a substrate having plurality of pixel portions respectively including a first switching member, and at least one light sensing portion disposed to face corresponding one of the color pixels, the at least one light sensing portion sensing light provided through the corresponding color pixel,
   wherein the corresponding color pixel is a red color pixel so that red light is provided to the at least one light sensing portion through the red color pixel,
   wherein the at least one light sensing portion includes:
   a second switching member controlled by the light provided through the corresponding color pixel, the second switching member generating a first signal in response to the light;
   a first sensing line electrically connected to the second switching member; and
   a third switching member controlled by a second signal provided via a gate line, the third switching member transferring the first signal from the second switching member to a second sensing line in response to the second signal.

2. The display device of claim 1, wherein the second switching member is a transistor including:
   gate and source electrodes commonly connected to the first sensing line; and
   a drain electrode connected to the third switching member.

3. The display device of claim 2, wherein the third switching member is a transistor including:
   a gate electrode connected to the gate line; and
   a conduction path connected between the second switching member and the second sensing line.

4. The display device of claim 3, wherein the first switching member is connected to the data line and the gate line to display an image, the first signal being provided to the first switching member as a data driving signal and the second signal being provided to the first switching member as a gate driving signal.

5. The display device of claim 3, wherein the first sensing line is disposed in a direction substantially parallel with the gate line, and the second sensing line is disposed in a direction substantially parallel with the data line.

6. The display device of claim 1, wherein the red light has a wavelength in a range from about 600 nm to about 700 nm.

7. The display device of claim 1, wherein the input light provided from the external object is white light.

8. The display device of claim 1, wherein the input light provided from the external object is red light having a wavelength in a range from about 600 nm to about 700 nm.

9. The display device of claim 1, wherein the pixel portions are arranged in a matrix form to display images.

10. The display device of claim 1, wherein the at least one light sensing portion includes multiple light sensing portions each of which is disposed at an area having a selected number of the pixel portions.

11. The display device of claim 10, wherein a number of the light sensing portions is smaller than a number of the pixel portions in a unit area.

12. The display device of claim 10, wherein the light sensing portions each have a size smaller than a size of the respective pixel portions.

* * * * *